United States Patent
Ogawa et al.

(10) Patent No.: US 8,735,501 B2
(45) Date of Patent: May 27, 2014

(54) COMPOSITION, METHOD FOR MANUFACTURING THE SAME, OPTICAL ELEMENT, LENS

(75) Inventors: Ryo Ogawa, Kawasaki (JP); Shintetsu Go, Yokohama (JP); Seiji Okada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 176 days.

(21) Appl. No.: 13/480,893

(22) Filed: May 25, 2012

(65) Prior Publication Data

US 2012/0309888 A1 Dec. 6, 2012

(30) Foreign Application Priority Data

May 31, 2011 (JP) .................. 2011-122743

(51) Int. Cl.
*C08F 277/00* (2006.01)
*C08F 232/00* (2006.01)
*C08G 61/02* (2006.01)
*C08L 45/00* (2006.01)

(52) U.S. Cl.
USPC ............ 525/256; 524/502; 524/553; 525/297

(58) Field of Classification Search
USPC ......................... 524/502, 553; 525/297, 256
See application file for complete search history.

(56) References Cited

U.S. PATENT DOCUMENTS

2009/0081387 A1* 3/2009 Suzuki ..................... 428/1.1

FOREIGN PATENT DOCUMENTS

| EP | 726291 A1 * | 8/1996 |
|---|---|---|
| JP | 61-221206 A | 10/1986 |
| JP | 64-106 A | 1/1989 |
| JP | 2-173112 A | 7/1990 |
| JP | 2007-91941 A | 4/2007 |

* cited by examiner

*Primary Examiner* — Satya Sastri
(74) *Attorney, Agent, or Firm* — Canon U.S.A., Inc., IP Division

(57) ABSTRACT

A composition contains a cycloolefin polymer and a cross-linked structure of a cross-linkable polymer having a specific structure.

14 Claims, 3 Drawing Sheets

ETHYLENE ELIMINATION REACTION OF 2,3-dimethylenebicyclo[2,2,1]heptane polymer

CROSS-LINKING REACTION OF 2,3-dimethylenebicyclo[2,2,1]heptane polymer

COMPOSITION, METHOD FOR MANUFACTURING THE SAME, OPTICAL ELEMENT, LENS

BACKGROUND OF THE INVENTION

1. Field of the Invention

The present invention relates to a composition which is transparent and has a low coefficient of linear expansion, an optical element, a lens, and a method for manufacturing the composition.

2. Description of the Related Art

A cycloolefin polymer has features of high transparency and also low water absorptivity and is known to be useful as a material of optical elements, such as a lens. In contrast, it is also known that the cycloolefin polymer has a problem in environmental stability, e.g., when used alone, the cycloolefin polymer is likely to be thermally deformed. In particular, since it is assumed that the optical elements, such as a lens, are used in various temperature environments, it is suitable that the optical elements contain materials with high environmental stability which are difficult to be thermally deformed, i.e., materials having a low coefficient of linear expansion and the like.

Herein, in order to improve the environmental stability of the cycloolefin polymer, Japanese Patent Laid-Open No. 2007-91941 (hereinafter referred to as Patent Document 1) discloses an example of forming the cycloolefin polymer into a polymer alloy with a cross-linked product of a thermally cross-linkable compound of any one of an epoxy compound, an amino resin precursor, and an isocyanate compound.

According to the finding of the present inventors, since the compatibility of the thermally cross-linkable compound of any one of an epoxy compound, an amino resin precursor, and an isocyanate compound with the cycloolefin polymer is not high, it cannot be said that the transmittance of the polymer alloy is sufficient.

SUMMARY OF THE INVENTION

Therefore, aspects of the present invention provides a composition which is transparent and is hard to be thermally deformed, i.e., a composition having a low coefficient of linear expansion. The composition according to the invention has a polymer having a repeated structural unit represented by at least one of the following formula (1) and formula (2) and having a number average molecular weight of 10000 or more and 200000 or lower, in which the composition further has a cross-linked structure having a repeated structural unit represented by Formula (3) and the cross-linked structure is contained in a proportion of 10 parts by weight or more and 1000 parts by weight or lower based on 100 parts by weight of the polymer having the repeated structural unit represented by Formula (1) or Formula (2).

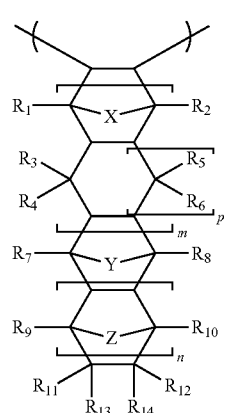

Formula (1)

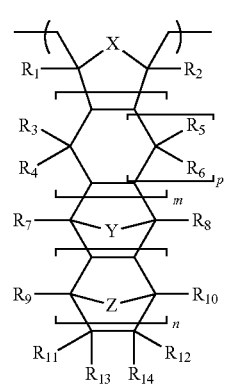

Formula (2)

In Formulae (1) and (2), m is 0 or 1, n is an integer of 0 to 3, and p is 0 or 1.

$R_1$ to $R_{14}$ each independently represent a hydrogen atom, a halogen atom, or a hydrocarbon group having 1 to 20 carbon atoms.

$R_{11}$ to $R_{14}$ may be combined with each other to form a monocyclic ring or a polycyclic ring, and the monocyclic ring or the polycyclic may have a double bond.

$R_{11}$ and $R_{13}$ or $R_{12}$ and $R_{14}$ may form an alkylidene group. X, Y, and Z each are independently selected from —O—, —NH—, —S—, —CH$_2$—, —CH$_2$—CH$_2$—, and —CH(CH$_3$)—.

In Formula (3), $R_{15}$ to $R_{20}$ and $R'_{15}$ to $R'_{20}$ each are independently selected from a hydrogen atom, a halogen atom, or a hydrocarbon group having 1 to 20 carbon atoms. A and A' each are independently selected from —O—, —NH—, —S—, —CH$_2$—, —CH$_2$—CH$_2$—, or —CH(CH$_3$)—.

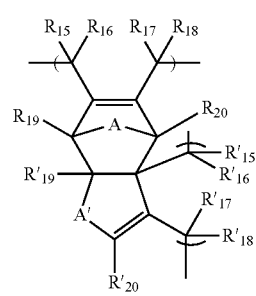

Formula (3)

A method for manufacturing the composition according to the invention has a feature of having a process for mixing a polymer having a repeated structural unit represented by at least one of the following formula (1) and formula (2) and having a number average molecular weight of 10000 or more and 200000 or lower and a polymer having a repeated structural unit represented by the following formula (4) and having a number average molecular weight of 1000 or more and 200000 or lower and a process for cross-linking the polymer having the repeated structural unit represented by the following formula (4).

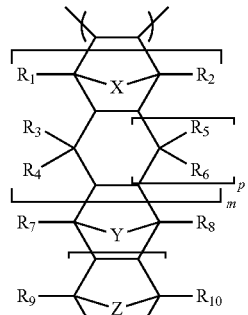

Formula (1)

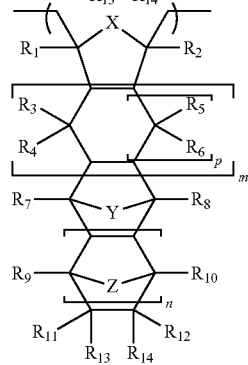

Formula (2)

In Formulae (1) and (2), m is 0 or 1, n is an integer of 0 to 3, and p is 0 or 1. $R_1$ to $R_{14}$ each independently represent a hydrogen atom, a halogen atom, or a hydrocarbon group having 1 to 20 carbon atoms. $R_{11}$ to $R_{24}$ may be combined with each other to form a monocyclic ring or a polycyclic ring, and the monocyclic ring or the polycyclic may have a double bond.

In Formula (4), l is an integer of 0 to 2. $R_{15}$ to $R_{26}$ each are selected from a hydrogen atom, a halogen atom, or a hydrocarbon group having 1 to 20 carbon atoms. $R_{23}$ and $R_{26}$ may be combined to form a ring. A and B each are independently selected from —O—, —NH—, —S—, —CH$_2$—, —CH$_2$—CH$_2$—, or —CH(CH$_3$)—.

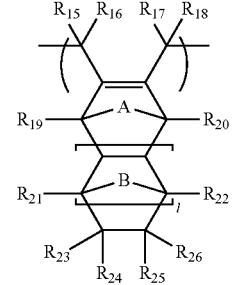

Formula (4)

Since the composition of the invention has a cross-linked structure, the coefficient of linear expansion is low. Since a cross-linked structure of a cross-linkable polymer having high compatibility with a cycloolefin polymer, the compatibility is high and the composition is transparent.

Further features of the present invention will become apparent from the following description of exemplary embodiments with reference to the attached drawings.

DESCRIPTION OF THE EMBODIMENTS

Figure 1A:
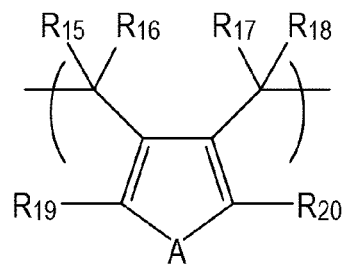
FIGS. 1A and 1B are views for explaining an example of a reaction in which a cross-linked structure is generated from a cross-linkable polymer.

Embodiments of the invention are described below but the invention is not limited thereto.

Composition

A composition according to a first embodiment has a polymer having a repeated structural unit represented by at least one of the following formula (1) and formula (2) and having a number average molecular weight of 10000 or more and 200000 or lower, in which the composition further has a cross-linked structure having a repeated structural unit represented by Formula (3) and the cross-linked structure is contained in a proportion of 10 parts by weight or more and 1000 parts by weight or lower based on 100 parts by weight of the polymer having the repeated structural unit represented by Formula (1) or Formula (2).

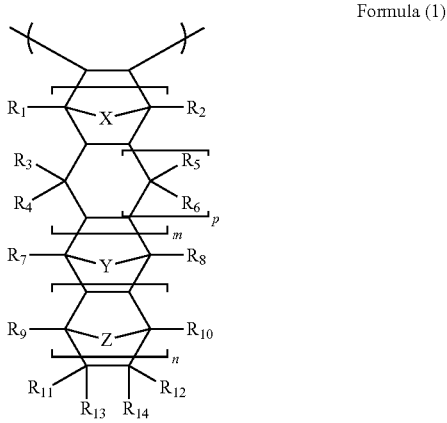

Formula (1)

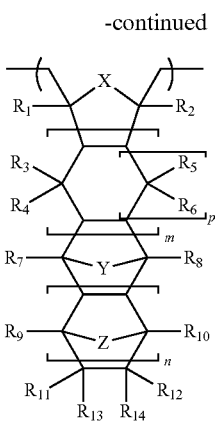

Formula (2)

In Formulae (1) and (2), m is 0 or 1, n is an integer of 0 to 3, and p is 0 or 1.

$R_1$ to $R_{14}$ each independently represent a hydrogen atom, a halogen atom, or a hydrocarbon group having 1 to 20 carbon atoms.

$R_{11}$ to $R_{14}$ may be combined with each other to form a monocyclic ring or a polycyclic ring, and the monocyclic ring or the polycyclic may have a double bond.

$R_{11}$ and $R_{13}$ or $R_{12}$ and $R_{14}$ may form an alkylidene group.

X, Y, and Z each are independently selected from —O—, —NH—, —S—, —$CH_2$—, —$CH_2$—$CH_2$—, and —CH($CH_3$)—.

In Formula (3), $R_{15}$ to $R_{20}$ and $R'_{15}$ to $R'_{20}$ each are independently selected from a hydrogen atom, a halogen atom, or a hydrocarbon group having 1 to 20 carbon atoms. A and A' each are independently selected from —O—, —NH—, —S—, —$CH_2$—, —$CH_2$—$CH_2$—, or —CH($CH_3$)—.

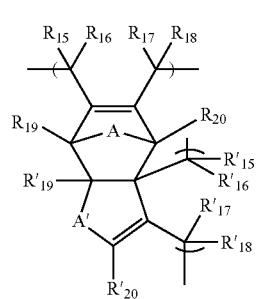

Formula (3)

Thus, since the composition according to this embodiment has a cross-linked structure having the repeated structural unit represented by Formula (3), the coefficient of linear expansion is low. As described later, the cross-linked structure according to this embodiment has any one of a branched structure, a structure in which a cross-linkable polymer and a cross-linkable polymer are cross-linked, or a three-dimensional net structure. Therefore, even when heat is applied, the molecular motion does not become active and the coefficient of linear expansion is low. In this embodiment, the coefficient of linear expansion is suitably 70 or lower.

In Formula (3), it is suitable that A and A' each are independently selected from —$CH_2$—, —$CH_2$—$CH_2$—, or —CH($CH_3$)—.

The polymer having the repeated structural unit represented by at least one of Formula (1) and Formula (2) (hereinafter referred to as a cycloolefin polymer) and the cross-linked structure of the cross-linkable polymer have high compatibility, are in a state of being entangled at a molecular level, and are transparent. Thus, the composition according to this embodiment has a low coefficient of linear expansion and is transparent. Herein, the structure in which the cross-linked structure and the linear polymer are entangled with each other at a molecular level without having a chemical bond in a state where the cross-linked structure and the linear polymer are independently present is referred to as a semi-interpenetrating network.

In the composition according to this embodiment, the crosslinking temperature of the cross-linkable polymer is high, so that the composition can be easily transformed at a temperature equal to or lower than the crosslinking temperature. Therefore, the formability is high. Therefore, the composition according to this embodiment is suitable for optical elements, such as a lens.

In this embodiment, the cross-linked structure is contained suitably in a proportion of 100 parts by weight or lower and more suitably in a proportion of 25 parts by weight or lower based on 100 parts by weight of the polymer having the repeated structural unit represented by Formula (1) or Formula (2). In Formula (3), it is suitable that $R_{15}$ to $R_{20}$ and $R'_{15}$ to $R'_{20}$ are hydrogen atoms and A and A' are independently selected from —$CH_2$—, —$CH_2$—$CH_2$—, or —CH($CH_3$)—. This is because it is considered that when A is a hydrophobic group, such as —$CH_2$—, —$CH_2$—$CH_2$—, or —CH($CH_3$)—, the water absorptivity of the cross-linked structure is low.

In Formulae (1) and (2), it is suitable that m+n is an integer of 0 to 2 and X, Y, and Z each are independently selected from —$CH_2$—, —$CH_2$—$CH_2$—, and —CH($CH_3$)—.

In Formula (1), it is suitable that m=0 and n=0, X, Y, and Z are all —$CH_2$—, and $R_1$ to $R_{10}$ are all hydrogen atoms.

In Formula (1), it is suitable that m=0 and n=1, X, Y, and Z are all —$CH_2$—, and $R_1$ to $R_{10}$ are all hydrogen atoms.

In Formula (2), it is suitable that m=0 and n=0, X, Y, and Z are all —$CH_2$—, and $R_1$ to $R_{10}$ are all hydrogen atoms.

Cross-Linked Structure

In this description, the cross-linked structure refers to one in which cross-linkable polymers are crosslinked to form a structure of any one of a branched structure, a structure in which a cross-linkable polymer and a cross-linkable polymer are crosslinked, or a three-dimensional net structure. Such a cross-linked structure is generated as follows. More specifically, due to the fact that a polymer which is a cross-linkable polymer and has the repeated structural unit represented by Formula (4) described later is heated, a main product illustrated in FIG. 1A and a by-product which is not illustrated are generated. The cross-linked structure is generated due to the fact that the main product is dimerized for self cross-linking. The reaction in which the main product and the by-product are generated is referred to as a retro-Diels-Alder reaction and the reaction in which the main product is dimerized for self cross-linking is referred to as a Diels-Alder reaction.

Figure 1B:
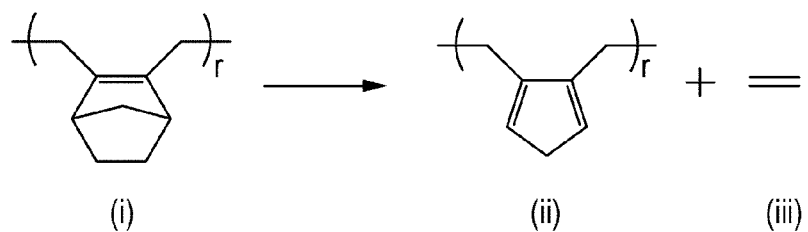
Figure 1B:
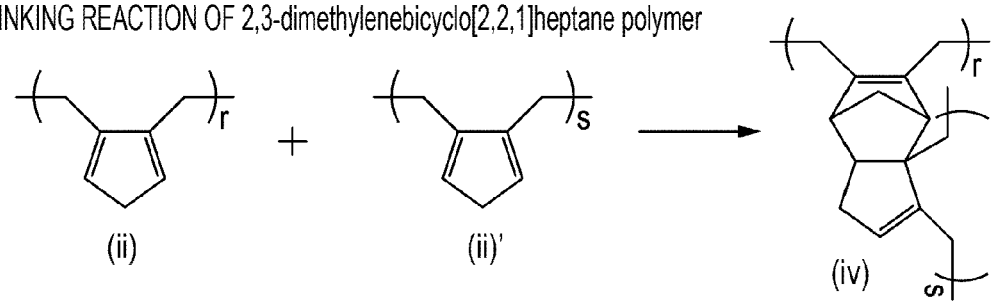
Figure 2A:
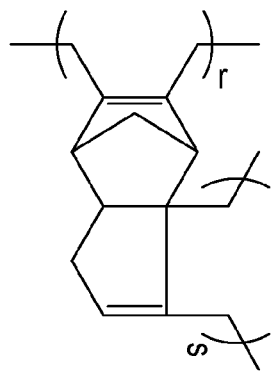
FIGS. 2A to 2E are views illustrating an example of cross-linking points of a cross-linked structure in an embodiment of the invention.
Figure 2B:
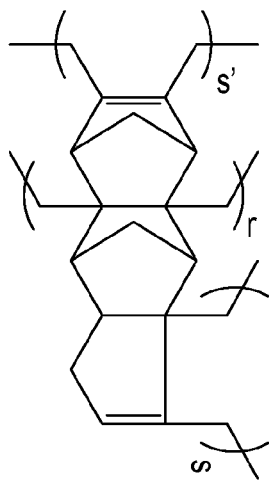
Figure 2C:
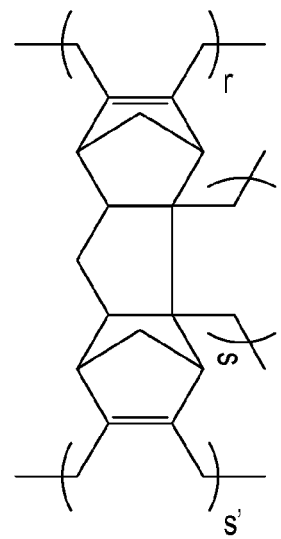
Figure 2D:
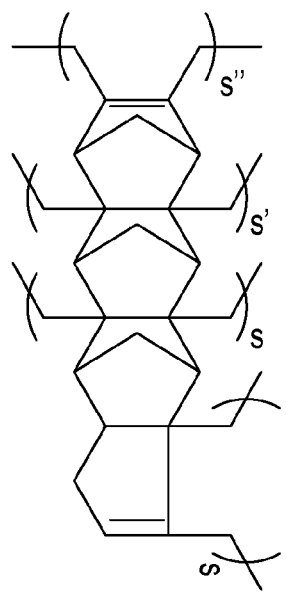
Figure 2E:
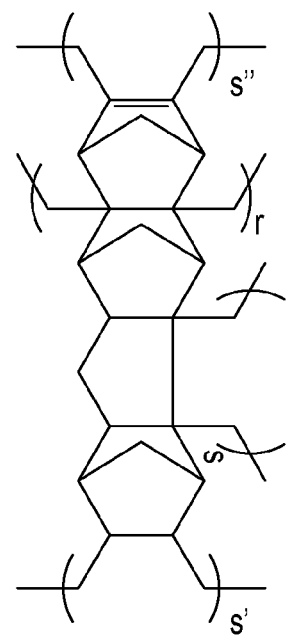

The reaction of generating the cross-linked structure is described in detail taking the case where the cross-linkable polymer is a 2,3-dimethylenebicyclo[2,2,1]heptane polymer as an example (FIG. 1B). First, ethylene (iii) is eliminated by heating a polymer (i) of 2,3-dimethylenebicyclo[2,2,1]heptane. A polymer (ii) which is generated by the elimination of ethylene and another polymer (ii)' which is similarly generated are dimerized for self-crosslinking (iv) to generate a cross-linked structure (v).

The cross-linked structure according to this embodiment may be a cross-linked structure having cross-linking points generated by the retro-Diels-Alder-reaction and the Diels-Alder reaction of the polymer having the repeated structural unit represented by Formula (4) described later. Mentioned as the structure of the cross-linking point are structures represented by FIG. 2A to FIG. 2E and the like when the cross-linkable polymer is the polymer of 2,3-dimethylenebicyclo [2,2,1]heptane.

The formation of the cross-linked structure by cross-linking of the cross-linkable polymers can be confirmed by analysis using Nuclear Magnetic Resonance (hereinafter abbreviated as NMR) or Fourier Transform Infrared Spectroscopy (hereinafter abbreviated as FTIR), Thermomechanical analysis (hereinafter abbreviated as TMA), Differential Scanning calorimetry (hereinafter abbreviated as DSC), Dynamic Mechanical Analysis (hereinafter abbreviated as DMA), or the like. For example, when there is a peak resulting from the structure represented by the cross-linked structure (iv) by specifying the structure using NMR or FTIR, it can be judged that a cross-linked structure is formed. Moreover, it can also be verified whether or not cross-linking is formed using an organic solvent which can dissolve a cross-linkable polymer before cross-linking and which cannot dissolve a cross-linked structure.

Cross-Linkable Polymer

The cross-linkable polymer according to this embodiment has a repeated structural unit represented by the following formula (4). The number average molecular weight of the thermally cross-linkable polymer according to this embodiment is suitably 1000 or more and 200000 or lower and more suitably 100000 or lower. When the number average molecular weight is 1000 or more, the polymer exhibits sufficient mechanical strength when using the composition according to this embodiment as a material of a lens or the like. Thus, such a number average molecular weight is suitable. When the number average molecular weight is 200000 or lower, the compatibility of the cross-linkable polymer according to this embodiment and a cycloolefin polymer is high. Thus, such a number average molecular weight is suitable.

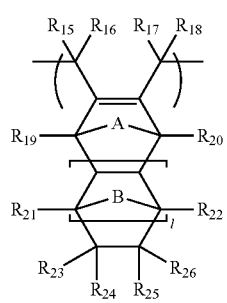

Formula (4)

In Formula (4), l is an integer of 0 to 2.

$R_{15}$ to $R_{26}$ each are selected from a hydrogen atom, a halogen atom, or a hydrocarbon group having 1 to 20 carbon atoms.

$R_{23}$ and $R_{26}$ may be combined to form a ring.

A and B each are independently selected from —O—, —NH—, —S—, —CH$_2$—, —CH$_2$—CH$_2$—, and —CH(CH$_3$)—.

In Formula (4), it is suitable that $R_{15}$ to $R_{26}$ are hydrogen atoms, l is 0 or 1, and A and B each are independently selected from —CH$_2$—, —CH$_2$—CH$_2$—, or —CH(CH$_3$)—. This is because it is considered that when A or B is a hydrophobic group, such as —CH$_2$—, —CH$_2$—CH$_2$—, or —CH(CH$_3$)—, the water absorptivity of the cross-linked structure is low.

The cross-linkable polymer according to this embodiment may be a copolymer having a structural unit other than the repeated structural unit represented by Formula (4) insofar as the effects such that the composition according to this embodiment is transparent and has a low coefficient of linear expansion are demonstrated. The copolymer may be any one of a random copolymer, an alternating copolymer, and a block copolymer. However, when a block copolymer undergoes phase separation to form a domain, it is necessary to adjust the molecular weight of the segments of the block copolymer as appropriate in such a manner that the domain size becomes equal to or lower than the wavelength of visible light in order for the composition according to this embodiment to maintain transparency. When the cross-linkable polymer according to this embodiment is a copolymer, the molar fraction of the repeated structural unit represented by Formula (4) in the cross-linkable polymer is suitably in the range of 5% to 100% in order to obtain an effect reducing the coefficient of linear expansion.

The polymer having the repeated structural unit represented by Formula (4) may be a partially hydrogenated polymer.

As the cross-linkable polymer according to this embodiment, a polymer having a repeated structural unit represented by the following formula (5) is suitable. The polymer having the repeated structural unit represented by the following formula (5) is obtained by polymerizing a monomer alone represented by Formula (6) described later.

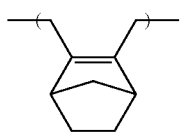

Formula (5)

Monomer Constituting Cross-Linkable Polymer

A monomer constituting the cross-linkable polymer according to this embodiment by polymerization is referred to as a monomer (A).

The monomer (A) in this embodiment is not particularly limited insofar as it forms the repeated structural unit represented by Formula (3) when polymerized and is polymerized by anionic polymerization or radical polymerization.

Mentioned as an example of the monomer (A) in this embodiment are 2,3-dimethylenebicyclo[2.2.1]-heptane (Formula (6)) and 2,3-dimethylene-7-oxabicyclo[2.2.1]heptane (Formula (7)) but the monomer (A) is not limited thereto.

Formula (6)

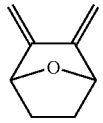

Formula (7)

As an example of the monomer (A) in this embodiment, cyclic diene monomers other than those represented by Formula (5) and Formula (6) described in Canadian Journal of Chemistry vol. 53. P. 256-262 or cyclic diene monomers other than those represented by Formula (6) and Formula (7) described in Macromolecules 2009, 42, 9268-9274 can be mentioned.

When the monomer (A) in this embodiment is any one of the monomers represented by Formula (6) and Formula (7), 2,3-dimethylenebicyclo[2,2,2]octane, 2,3-dimethylenetetracyclo[6.2.1.13, 6.02,7]dodecane, 2,3-dimethylene-1,4-metano-1,2,3,4-tetra-hydronaphthalene, and 2,3-dimethylene-1,4-metano-1,2,3,4-tetrahydroanthracene, the cross-linkable polymer according to this embodiment is easily prepared. Thus, such a monomer is suitable. When preparing the cross-linkable polymer according to this embodiment, a plurality of kinds of monomers among the above-mentioned monomers may be selected for use.

Monomers Other than Monomer (A)

The cross-linkable polymer according to this embodiment may be prepared using monomers other than the monomer (A) to form a copolymer in order to adjust the mechanical properties or heat characteristics of the cross-linkable polymer.

Mentioned as monomers other than the monomer (A) are conjugate dienes, such as butadiene or isoprene, (meth) acrylic monomers, such as (meth)acrylic acid methyl, maleic anhydride or maleimide anhydride derivatives, and styrene monomers, such as styrene.

Moreover, a plurality of kinds of the monomers may be selected from the above-mentioned monomers to form a copolymer.

Cycloolefin Polymer

The cycloolefin polymer according to this embodiment is a polymer having the repeated structural unit represented by at least one of Formula (1) and Formula (2) and the number average molecular weight thereof is 10000 or more and 200000 or lower. When the number average molecular weight of the cycloolefin polymer according to this embodiment is 10000 or more, the cycloolefin polymer exhibits sufficient mechanical strength when using the composition according to this embodiment as a material of a lens or the like. Thus, such a number average molecular weight is suitable. When the number average molecular weight is 200000 or lower, the compatibility of the cross-linkable polymer according to this embodiment and the cycloolefin polymer is high. Thus, such a number average molecular weight is suitable.

When the values of the number average molecular weight of the cycloolefin polymer according to this embodiment and the number average molecular weight of the cross-linkable polymer according to this embodiment are close to each other, it is considered that the compatibility is high. Thus, such a case is suitable.

The cross-linkable polymer according to this embodiment may be a copolymer having a structural unit other than the repeated structural unit represented by Formula (1) or (2) insofar as the effects such that the composition according to this embodiment is transparent and has a low coefficient of linear expansion are demonstrated. The copolymer may be any one of a random copolymer, an alternating copolymer, and a block copolymer. However, when a block copolymer undergoes phase separation to form a domain, it is necessary to adjust the molecular weight of the segments of the block copolymer as appropriate in such a manner that the domain size becomes equal to or lower than the wavelength of visible light in order for the composition according to this embodiment to maintain transparency.

The cycloolefin polymer according to this embodiment suitably contains at least one kind of a cycloolefin polymer selected from the following polymer (B1) or polymer (B2):

Polymer (B1): Ethylene/cycloolefin random copolymer obtained by copolymerizing ethylene and cycloolefin;

Polymer (B2): Cycloolefin-based ring-opened polymer or a copolymer thereof.

The polymers (B1) and (B2) are described later.

Monomer Constituting Cycloolefin Polymer

Mentioned as a monomer constituting the cycloolefin polymer according to this embodiment is the compound represented by the following formula (8).

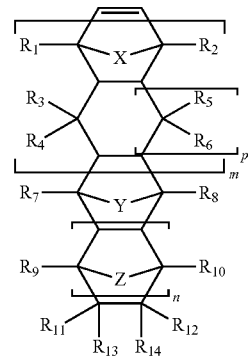

Formula (8)

In Formula (8), m is 0 or 1, n is an integer of 0 to 3, p is 0 or 1, $R_1$ to $R_{14}$ each independently represent a hydrogen atom, a halogen atom, or a hydrocarbon group having 1 to 20 carbon atoms.

$R_{11}$ to $R_{14}$ may be combined with each other to form a monocyclic ring or a polycyclic ring, and the monocyclic ring or the polycyclic may have a double bond.

$R_{11}$ and $R_{13}$ or $R_{12}$ and $R_{14}$ may form an alkylidene group.

X, Y, and Z each are independently selected from —O—, —NH—, —S—, —$CH_2$—, —$CH_2$—$CH_2$—, and —CH($CH_3$)—. It is suitable that X, Y, and Z each are selected from —$CH_2$—, —$CH_2$—$CH_2$—, or —CH($CH_3$)—. This is because it is considered that when X, Y, and Z are hydrophobic groups, such as —$CH_2$—, —$CH_2$—$CH_2$—, or —CH($CH_3$)—, the water absorptivity of the cross-linked structure is low.

Examples of the cycloolefin in this embodiment are shown in Formula (9-1) to Formula (18).

In the case of m=0 and n=0 in Formula (8), the cycloolefins represented by the following formulae are mentioned:

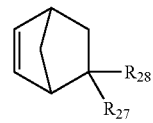

Formula (9-1)

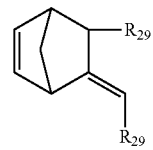

Formula (9-2)

Formula (9-3)
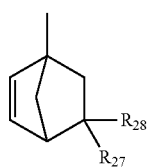
Formula (9-4)
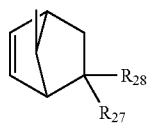
Formula (9-5)
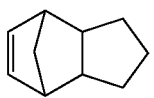
Formula (9-6)
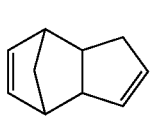
Formula (9-7)
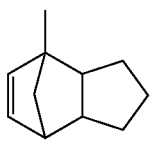
Formula (9-8)
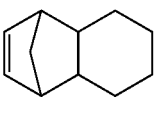
Formula (9-9)
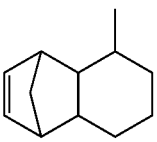
Formula (9-10)
In the case of m=0 and n=1 in Formula (8), the cycloolefins represented by the following formulae are mentioned:
Formula (10-1)
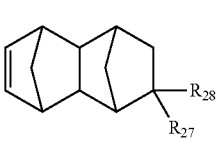
Formula (10-2)
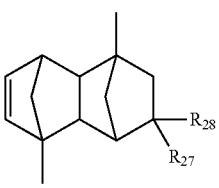
Formula (10-3)
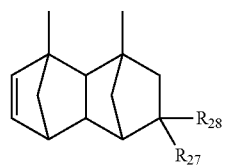
Formula (10-4)
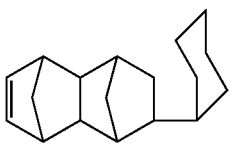
Formula (10-5)
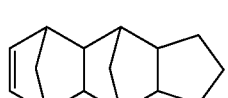
Formula (10-6)
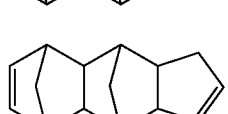
Formula (10-7)
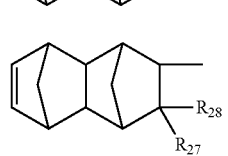
Formula (10-8)
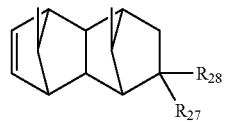
Formula (10-9)
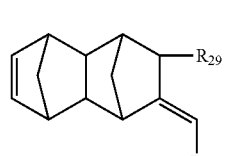
Formula (10-10)
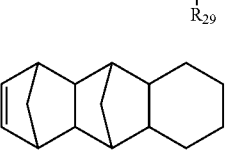
Formula (10-11)
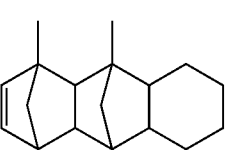
Formula (10-12)
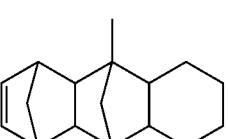
Formula (10-13)
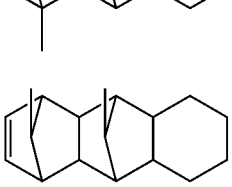

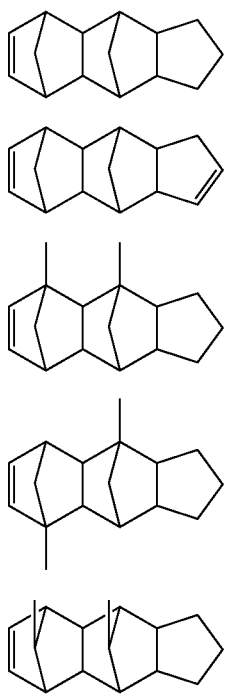

Formula (10-14)

Formula (10-15)

Formula (10-16)

Formula (10-17)

Formula (10-18)

In the case of m=0 and n=2 in Formula (8), the cycloolefins represented by the following formulae are mentioned:

Formula (11-1)

Formula (11-2)

Formula (11-3)

Formula (11-4)

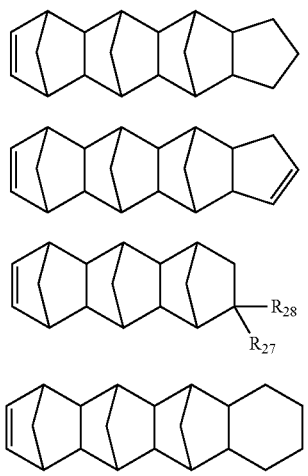

In the case of m=0 and n=3 in Formula (8), the cycloolefin represented by the following formula is mentioned:

Formula (12)

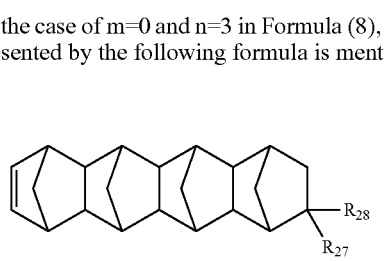

In the case of m=1, n=0, and p=0 in Formula (8), the cycloolefins represented by the following formulae are mentioned:

Formula (13-1)

Formula (13-2)

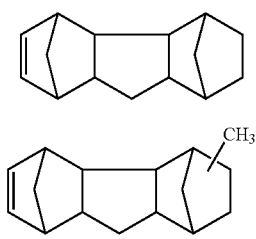

Herein, Formula (13-2) represents a methyl substituent of Formula (13-1).

In the case of m=1, n=1, and p=0 in Formula (8), the cycloolefins represented by the following formulae are mentioned:

Formula (14-1)

Formula (14-2)

Herein, Formula (14-2) is a dimethyl substituent of Formula (14-1).

In the case of m=1, n=2, and p=0 in Formula (8), the cycloolefins represented by the following formulae are mentioned:

Formula (15-1)

Formula (15-2)

Herein, Formula (15-2) is a trimethyl substituent of Formula (15-1).

In the case of m=1, n=0, and p=1 in Formula (8), the cycloolefin represented by the following formula is mentioned:

Formula (16)

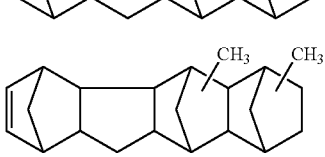

In the case of m=1, n=1, and p=1 in Formula (8), the cycloolefin represented by the following formula is mentioned:

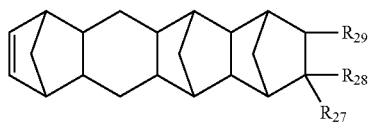

Formula (17)

In the case of m=1, n=1, and p=1 in Formula (8), the cycloolefin represented by the following formula is mentioned:

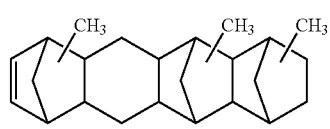

Formula (18)

Herein, Formula (18) is a trimethyl substituent.

$R_{27}$ and $R_{28}$ in Formula (9-1) to Formula (18) each are independently selected from H, $CH_3$, $C_2H_5$, $C_4H_9$, $C_6H_{13}$, $C_8H_{17}$, $C_{18}H_{37}$, CN, $CO_2CH_3$, $CO_2C_2H_5$, $CO_2C_4H_9$, $CO_2C_6H_{11}$, $CH_2(C_6H_5)$, and $C_6H_5$.

$R_{29}$ in Formula (9-1) to Formula (18) is selected from H, $CH_3$, $C_2H_5$, $CH(CH_3)_2$, and $C_4H_9$.

As a method for manufacturing the cycloolefin represented by Formula (8) shown above, a Diels-Alder reaction of cyclopentadiene and olefins having a corresponding structure can be mentioned, for example. These cycloolefins can also be used alone or in combination of two or more kinds thereof.

The cycloolefin polymer having the repeated structural unit represented by Formula (1) or (2) for use in the invention can be manufactured by selecting conditions as appropriate according to a known method using the cycloolefin represented by Formula (8) shown above.

Polymer (B1)

In this embodiment, the polymer (B1) is a copolymer containing a repeated constituent unit derived from ethylene and a repeated constituent unit derived from cycloolefin as the main constituent component. These copolymers can be obtained by addition copolymerization of ethylene and cycloolefin, for example. The polymer (B1) is a cycloolefin polymer having the repeated structural unit represented by Formula (1). As the polymer (B1) in this embodiment, a copolymer of ethylene (Formula (19)) and 2-norbornene (Formula (20)) is suitable.

Formula (19)

Formula (20)

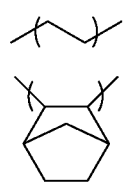

It is suitable that the molar ratio of the repeated structural units represented by Formula (19) and Formula (20) is in the range of 5:95 to 95:5 and more suitably in the range of 30:70 to 90:10.

As the polymer (B1) in this embodiment, a copolymer of ethylene (Formula (19) shown above) and tetracyclo dodecene (Formula (21) shown below) is suitable.

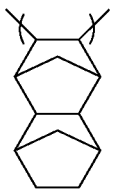

Formula (21)

In this embodiment, other α-olefins other than ethylene may be added and copolymerized in addition to ethylene and cycloolefin.

The α-olefin may have a straight-chain or branched structure. The α-olefin is suitably α-olefin having 3 to 20 carbon atoms. As a specific example, straight chain α-olefins having 3 to 20 carbon atoms, such as propylene, 1-butene, 1-pentene, 1-hexene, 1-octene, 1-decene, 1-dodecene, 1-tetradecene, 1-hexadecene, 1-octadecene, and 1-eicocene; branched chain α-olefins having 4 to 20 carbon atoms, such as 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, and 3-ethyl-1-hexene, and the like can be mentioned.

Such straight chain or branched-chain α-olefins can be used alone or in combination of two or more kinds thereof.

The ethylene/cycloolefin random copolymer (B1) for use in this embodiment may have a constituent unit derived from other copolymerizable monomers as required insofar as the purpose of the invention is not impaired.

Mentioned as such other monomers are, for example, monocyclic cycloalkene, such as cyclobutene, cyclopentene, cyclohexene, and 3,4-dimethyl cyclopentene. Mentioned as alicyclic conjugate diene are cyclopentadiene, cyclohexadiene, and the like. Mentioned as vinylcycloalkene are vinylcyclopentene, 2-methyl-4-vinylcyclopentene, vinylcyclohexene, and the like. Mentioned as vinylcycloalkane are vinylcyclopentane, 2-methyl-4-vinylcyclopentane, vinylcyclohexane, vinylcyclooctane, and the like. Mentioned as aromatic vinyl monomers are styrene, α-methylstyrene, divinylbenzene, vinylnaphthalene, vinyltoluene, and the like. The monomers are not limited thereto. Other monomers mentioned above can be used alone or in combination.

In the polymer (B1), a manufacturing method is suitable which includes performing a polymerization reaction in a hydrocarbon solvent and in which a catalyst formed from a soluble vanadium compound and an organoaluminum compound is used for the hydrocarbon solvent.

In this copolymerization reaction, a solid metallocene catalyst of Group IV of the periodic table can also be used. Herein, the solid metallocene catalyst of Group IV of the periodic table is a catalyst containing a transition metal compound containing a ligand having a cyclopentadienyl skeleton, an organoaluminumoxy compound, and an organoaluminum compound which is compounded as required. Herein, mentioned as the transition metal compound of Group IV of the periodic table is zirconium, titanium, or hafnium.

As an example of the ligand containing a cyclopentadienyl skeleton, a cyclopentadienyl group which may be substituted with an alkyl group, an indenyl group, a tetrahydroindenyl group, and a fluorenyl group can be mentioned. These groups may be combined through another group, such as an alkylene group. Mentioned an example of a ligand other than the ligand containing a cyclopentadienyl skeleton are an alkyl group, a cycloalkyl group, an aryl group, an aralkyl group, and the like.

As the organoaluminumoxy compound and the organoaluminum compound, a substance which is usually used for the manufacturing of polyolefin can be used. For the solid metallocene catalyst of Group IV of the periodic table, substances described in, for example, Japanese Patent Laid-Open Nos. 61-221206, 64-106, 2-173112, and the like can be used.

The polymer (B1) may also be formed into a hydrogenated substance by hydrogenating the polymer (B1) in the presence of a known hydrogenation catalyst.

By the use of the above-described manufacturing method, the polymer (B1) having the repeated structural unit derived from the cycloolefin denoted by Formula (1) can be obtained.

Polymer (B2)

In this embodiment, the polymer (B2) is a cycloolefin-based ring-opened polymer or a copolymer of cycloolefin-based ring-opened polymers.

The cycloolefin-based ring-opened polymer refers to one obtained by polymerizing or copolymerizing the cycloolefin represented by Formula (8) above in the presence of a ring opening polymerization catalyst or a polymer obtained by hydrogenating a polymerized or copolymerized one in the presence of a hydrogenation catalyst. For example, mentioned as a polymer obtained by polymerizing the cycloolefin represented by Formula (8), and then hydrogenating the same in the presence of a hydrogenation catalyst is a polymer having the repeated structural unit represented by Formula (2).

The copolymer of the cycloolefin-based ring-opened polymers is prepared using two or more different kinds of cycloolefins. The copolymer of the cycloolefin-based ring-opened polymers may have a constituent unit derived from other copolymerizable monomers insofar as the purpose of the invention is not impaired, and can be combined by adding the same to cycloolefin insofar as the effects of the invention are not impaired. Mentioned as other copolymerizable monomers are, for example, monocyclic cycloalkene, such as cyclobutene, cyclopentene, cyclohexene, and 3,4-dimethyl cyclopenten. Mentioned as an alicyclic conjugate diene are cyclopentadiene, cyclohexadiene, and the like. Mentioned as vinylcycloalkene are vinylcyclopentene, 2-methyl-4-vinyl-cyclopentene, vinylcyclohexene, and the like. Mentioned as vinylcycloalkane are vinylcyclopentane, 2-methyl-4-vinyl-cyclopentane, vinylcyclohexane, vinylcyclooctane, and the like. Mentioned as an aromatic vinyl monomer are styrene, α-methylstyrene, divinylbenzene, vinylnaphthalene, vinyltoluene, and the like but the monomer are not limited thereto.

Usable for the ring-opening polymerizing catalyst is a catalyst containing a halide, a nitrate, or an acetylacetone compound of a metal selected from ruthenium, rhodium, palladium, osmium, indium, platinum, or the like and a reducing agent or a catalyst containing a halide or an acetylacetone compound of a metal selected from titanium, palladium, zirconium, molybdenum, or the like and an organoaluminum compound.

Herein, there is a possibility that the fact that an unsaturated bond remains in a portion connecting the repeated structural units of the cycloolefin polymer causes yellowing during thermoforming or with the progress of time. Therefore, the polymer (B2) is suitably a polymer containing the repeated structural unit represented by Formula (2) in a proportion of 90% or more which is a hydrogenated cycloolefin polymer.

Specifically, in the hydrogenation reaction, the used amount of the hydrogenation catalyst, the reaction temperature, the hydrogen partial pressure, the reaction time, and the reaction solution concentration can be set in the optimal range as appropriate depending on the kind of the polymer to be hydrogenated. The hydrogenation catalyst is not particularly limited and a homogeneous catalyst obtained by combining a metal compound, such as nickel and cobalt, and organic aluminum or organic lithium is suitable. For the hydrogenation catalyst, a carrier, such as activated carbon, diatomite, and magnesia, can be used as required.

It is suitable that the used amount of the hydrogenation catalyst is 0.01 to 50 parts by weight per 100 parts by weight of the polymer, the reaction temperature is 25 to 300° C., the hydrogen partial pressure is 0.5 to 10 MPa, and the reaction time is 0.5 to 20 hours.

The hydrogenated polymer can be obtained by removing a solvent or the like from the solution from which the hydrogenation catalyst is separated by filtration by filtering the hydrogenation reaction solution.

The polymer (B1) and the cycloolefin-based ring-opened polymer or the copolymer (B2) may be graft modified.

As a modifier for use in the graft modification, unsaturated carboxylic acids are usually mentioned. Specifically mentioned are unsaturated carboxylic acids, such as (meth)acrylic acid, maleic acid, fumaric acid, tetrahydrophthalic acid, itaconic acid, citraconic acid, crotonic acid, isocrotonic acid, and endo-cis-bicyclo[2.2.1]hepto-5-en-2,3-dicarboxylic acid (nadic acid, TM), derivatives of these unsaturated carboxylic acids, such as ester compounds of unsaturated carboxylic acid anhydride, unsaturated carboxylic acid halide, unsaturated carboxylic acid amide, unsaturated carboxylic acid imide, and unsaturated carboxylic acid, and the like.

More specifically, mentioned as the derivatives of unsaturated carboxylic acids are maleic acid anhydride, citraconic acid anhydride, maleyl chloride, maleimide, monomethyl maleate, dimethyl maleate, glycidyl maleate, and the like.

These modifiers can be used in combination of two or more kinds of thereof.

Such a graft modified substance can also be manufactured by compounding the modifier in an unmodified polymer in such a manner as to achieve a desired modification ratio for graft polymerization or can also be manufactured by preparing a modified substance with a high modification ratio beforehand, and then mixing the modified substance and an unmodified polymer in such a manner as to achieve a desired modification ratio.

In order to obtain the graft modified substance, known polymer modification methods can be widely applied. For example, the graft modified substance can be obtained by a method including adding the modifier to a polymer which is in a molten state and is not modified for graft polymerization (reaction), a method including adding the modifier to a solvent solution of an unmodified polymer for graft reaction, or the like. Such a graft reaction is usually performed at a temperature of 60 to 350° C. The graft reaction can be performed in the coexistence of radical initiators, such as an organic peroxide and an azo compound.

As a specific example of the cycloolefin polymer having the repeated structural unit represented by at least one of Formulae (1) and (2), Zeonex (trade name) or Zeonor (trade name) manufactured by Nippon Zeon Co., Ltd., ARTON (trade name) manufactured by JSR, Inc., APEL manufactured by Mitsui Chemicals, Inc., TOPAS (trade name) manufactured by Polyplastics, Inc., and the like can be mentioned but the cycloolefin polymer is not limited thereto. As TOPAS, TOPAS5013S-04 and the like are mentioned.

As the cycloolefin polymer according to this embodiment, the known cycloolefin polymers mentioned above can be arbitrarily used. In order to maintain a low water absorptivity, it is suitable to use a cycloolefin polymer in which the hetero atom content (oxygen, sulfur, and the like) is 10% or lower in terms of atomic concentration.

Third Component

The composition according to this embodiment may contain the polymer having the structural unit represented by at least one of Formula (1) and Formula (2) or a polymer containing a structural unit other than the cross-linked structure represented by Formula (3). For example, a styrene polymer, a (meth)acrylic polymer, an epoxy polymer, and the like are mentioned. The resin itself may have a cross-linked structure.

Moreover, known additives, such as a degradation prevention agent, an ultraviolet ray prevention agent, an antioxidant, a plasticizer, an infrared absorbent, and the like may be added.

The composition according to this embodiment may have inorganic particles. The inorganic particles may be further combined with the cross-linked structure represented by Formula (3) above or the cycloolefin polymer having the structural unit represented by Formula (1) or Formula (2).

Inorganic Particles

In this embodiment, it is suitable that the inorganic particles contain any one of silicon oxide, metal oxide, compound metal oxide, metal sulfide, a metal compound semiconductor, metal, or diamond. Mentioned as an example of the metal oxide are aluminum oxide, titanium oxide, niobium oxide, tantalum oxide, zirconium dioxide, zinc oxide, magnesium oxide, tellurium oxide, yttrium oxide, indium oxide, tin oxide, indium oxide tin, and the like. Mentioned as an example of the compound metal oxide are lithium niobate, potassium niobate, lithium tantalate, and the like. Mentioned as an example of the metal compound semiconductor are metal sulfides, such as zinc sulfide and cadmium sulfide, zinc selenide, cadmium selenide, zinc telluride, cadmium telluride, and the like. Mentioned as an example of the metal are gold and the like. Moreover, so-called core shell type inorganic particles in which one kind of inorganic particles are coated with other inorganic components can also be used. The shape of the inorganic particles may be any one of a globular shape, an oval shape, a flat shape, or a rod shape.

The inorganic particles to be used can be selected as appropriate in accordance with the performance required in the optical element described later. For example, when aiming at an improvement of the refractive index of the optical element described later, it is suitable to use inorganic particles with a high refractive index, such as titanium oxide, niobium oxide, tantalum oxide, and zirconium oxide.

Moreover, when transparency is required in the optical element, in order to suppress scattering of the inorganic particles, the average primary particle diameter of the inorganic particles is suitably 30 nm or lower and more suitably 10 nm or lower.

When adding the inorganic particles to the composition according to this embodiment, a dispersion aid may be compounded in order to increase the dispersibility of the inorganic particles. The dispersion aid is not particularly limited insofar as it has a functional group to be combined with the inorganic particles and has compatibility with an organic solvent to be used for manufacturing composite particles.

Mentioned as the functional group to be combined with the inorganic particles are a carboxylic acid group, an acyl halide group, a sulfonic acid group, a sulfinic acid group, a phosphoric acid group, a phosphoric acid group, a phosphinic acid group, an amino group, an amide group, a thiol group, an alkoxysilyl group, a silyl halide group, an alkoxytitanyl group, a titanyl halide group, and the like. Among the above, the alkoxysilyl group is suitable for ease of availability.

Mentioned as a specific example of the alkoxy silyl group are methyl trimethoxy silane, dimethyl dimethoxy silane, trimethyl methoxy silane, n-propyl trimethoxy silane, n-butyl triethoxy silane, n-hexyl trimethoxy silane, n-hexyl triethoxy silane, n-octyl triethoxy silane, n-decyl trimethoxy silane, cyclopentyl trimethoxy silane, phenyl trimethoxy silane, diphenyl dimethoxy silane, and the like. In this embodiment, for the composition and the inorganic particles, a method for mixing them by giving a shearing force with a melting and kneading device for kneading, a method for mixing the composite particles and the transparent resin in an organic solvent, and re-precipitating the same in a poor solvent, or the like is used.

In the composition of this embodiment, resin additives which are generally used regularly, such as an antioxidant, a neutralizer, a lubricant, an antistatic agent, a bleaching agent, a heat stabilizer, a light resistant stabilizer, a plasticizer, a coloring agent, a shock-resistance improving agent, an extender, a mold release agent, a foaming agent, and a processing aid, can be compounded as required. Mentioned as a specific example of the additives are additives mentioned in R. Gachter and H. Muller, Plastics Additives Handbook, 4th edition, 1993.

As such resin additives, various kinds of additives can be used as appropriate insofar as the inorganic particles and the composition can be compatibilized and the inorganic particles can be dispersed in transparent resin, and various kinds of additives may be used alone or in combination.

Method for Manufacturing Composition

A method for manufacturing a composition has a process for mixing a polymer having the repeated structural unit represented by at least one of Formula (1) and Formula (2) shown above and having a number average molecular weight of 10000 or more and 200000 or lower and a polymer having the repeated structural unit represented by Formula (4) and having a number average molecular weight of 1000 or more and 200000 or lower to thereby form a mixture; and a process for heating the mixture to cross-link the polymer having the repeated structural unit represented by Formula (4).

In this embodiment, the cross-linked structure is suitably contained in a proportion of 10 parts by weight or more and 1000 parts by weight or lower based on 100 parts by weight of the polymer having the repeated structural unit represented by Formula (1) or Formula (2). Moreover, in order to reduce the coefficient of linear expansion and to obtain a transparent molded material, the cross-linked structure is suitably contained in a proportion of 10 parts by weight or more and 30 parts by weight or lower based on 100 parts by weight of the polymer having the repeated structural unit represented by Formula (1) or Formula (2). This is because when the amount of the cross-linked structure is small, the effect of reducing the coefficient of linear expansion is not sufficiently obtained and when the addition amount excessively increases, the formability is considerably deteriorated due to foaming in connection with the generation of gas under processing due to ethylene elimination.

When the cycloolefin polymer according to this embodiment and the cross-linkable polymer according to this embodiment are mixed, the cycloolefin polymer and the cross-linkable polymer having high compatibility are entangled at a molecular level. Next, it is considered that, by cross-linking the cross-linkable polymer, a composition is obtained which has a structure (semi-interpenetrating network) in which the cross-linked structure and a linear polymer are entangled with each other at a molecular level without having a chemical bond in a state where the cross-linked structure and the linear polymer are independently present.

The composition having the semi-interpenetrating network can be formed by, for example, a method including cross-linking and polymerizing a monomer, an oligomer and/or a polymer capable of forming cross-linking in a state where a non-cross-linked polymer is dissolved or swelled with a solvent or by non-cross-linking and polymerizing a monomer in a state where a cross-linkable polymer is swollen by a monomer and/or a polymer in the presence or absence of a solvent. In this embodiment, since the composition has transparency, the cross-linkable polymer and the non-cross-linkable polymer are compatibilized. The semi-interpenetrating network can be verified by an analysis employing NMR or FTIR or a method, such as TMA, DSC, or DMA.

It can also be verified whether cross-linking is formed by the use of an organic solvent which can dissolve a cross-linkable polymer before cross-linking and cannot dissolve a cross-linked structure.

Herein, a monomer which forms a polymer having the repeated structural unit represented by Formula (4) by polymerizing is used as a monomer (A) and a thermally cross-linkable polymer which is obtained by polymerizing the monomers (A) is used as a polymer (A). A monomer which forms the repeated structural unit represented by Formula (1) or Formula (2) is used as a monomer (B) and a cycloolefin polymer obtained by polymerizing the monomers (B) is used as a polymer (B).

As an example of the method for manufacturing the composition according to this embodiment has the following processes.

(1) Polymerizing the monomers (A) to obtain the polymer (A).
(2) Polymerizing the monomers (B) polymerized to obtain the polymer (B).
(3) Mixing the polymer (A) and the polymer (B), and then heating the obtained composition to obtain a cross-linked structure.

The method for manufacturing the composition according to this embodiment may include a process other than the processes of (1), (2), and (3). For example, the method may include a process for adding a cross-linking agent or a cross-linking aid to the composition according to this embodiment, a process for purifying the polymer (A) or the polymer (B), a process for hydrogenating the polymer (A) or the polymer (B), or a process for mixing inorganic particles with the composition according to this embodiment.

For the mixing method of the process (3), a manufacturing method including giving a shearing force to the polymers with a melting and kneading device and kneading them, a method including mixing the polymers in an organic solvent, and then re-precipitating the same in a poor solvent, or the like is used.

Cross-Linking Agent and Cross-Linking Aid

In the method for manufacturing the composition according to this embodiment, a method for producing a cross-linked structure is not particularly limited and a cross-linking agent and/or a cross-linking aid may be used. As an example of the cross-linking agent, known materials, such as an organic peroxide and an azo initiator, can be used. As an example of the cross-linking aid, known materials, such as a (meth)acrylic monomer, a (meth)acrylic oligomer, a vinyl compound, and a compound having an aryl group, can be used.

Organic Solvent

The production of the composition containing the monomer (A) and the monomer (B) may be performed in an organic solvent. The organic solvent to be used for the case is not particularly limited and it is desirable to use one having compatibility with the monomer (A) and the monomer (B). An aliphatic hydrocarbon solvent, an aromatic hydrocarbon solvent, a ketone solvent, an ester solvent, an ether solvent, a cyclic ether solvent, an alcohol solvent, a halogen solvent, and the like can be used. Mentioned as the aliphatic hydrocarbon solvent are, for example, pentane, hexane, heptane, decane, and cyclohexane. Mentioned as the aromatic hydrocarbon solvent are, for example, benzene, toluene, and xylene. Mentioned as the ketone solvent are, for example, acetone, methyl ethyl ketone, methyl isobutyl ketone, and cyclohexanone. Mentioned as the ester solvent are, for example, methyl acetate, ethyl acetate, propyl acetate, and butyl acetate. Mentioned as the ether solvent are, for example, diethylether and dimethoxyethane. Mentioned as the cyclic ether solvent are, for example, tetrahydrofuran and dioxane. Mentioned as the alcohol solvent are methanol, ethanol, propanol, isopropanol, butanol, cyclohexanol, and the like. Mentioned as the halogen solvent are, for example, chloroform, 1,2-dichloroethane, methylene chloride, carbon tetrachloride, trichloroethylene, tetrachloroethylene, chlorobenzene, tetrachloro ethane, and bromobenzene. Two or more kinds of the organic solvents can be mixed.

Method for Preparing Cross-Linkable Polymer

The cross-linkable polymer according to this embodiment can be prepared by performing radical polymerization or anionic polymerization of the monomers (A).

When performing radical polymerization, the monomers can be polymerized using, for example, at least one kind of a radical polymerization initiator. As the radical polymerization initiator, a known substance can be used. Mentioned as a specific example thereof are an azo initiator, a peroxide initiator, a redox initiator, an atom transfer radical polymerization initiator, a nitroxide initiator, and the like. In particular, it is suitable to use the azo initiator or the peroxide initiator which has various types and thus can be suitably selected in accordance with the type of monomers, is easily obtained, and is inexpensive. When the used amount of the radical polymerization initiator is 0.1% mol or more and 20% mol or lower based on the mole number of the monomer (A), the yield of a copolymer is good and the molecular weight of the copolymer is easily controlled. Therefore, such an amount is suitable. When adding a polymerization accelerator, a chain transfer agent, or the like typified by amine, thiol, disulfide, or the like for polymerizing the monomers (A), the polymerization can be accelerated. Therefore, it is suitable.

When performing anionic polymerization, the monomers can be polymerized using, for example, at least one kind of an organometallic compound. Mentioned as a specific example of the organometallic compound are anionic polymerization initiators, such as hydrocarbon lithium, such as methyllithium, n-butyllithium, sec-butyllithium, tert-butyllithium, and phenyllithium and a Grignard reagent, and the like. Among the above, it is suitable to use n-butyllithium which is easily obtained and is inexpensive. The used amount of the organometallic compound is not particularly limited. When the used amount of the organometallic compound is 0.1% mol or more and 20% mol or lower based on the total mole number of the monomer (A), the yield of a copolymer is good and the molecular weight of the copolymer is easily controlled. Therefore, such an amount is suitable.

Organic Solvent

The polymerization reaction of the monomer (A) may be performed in an organic solvent. The organic solvent for use in that case is not particularly limited and it is desirable to use one having compatibility with the monomer (A). An aliphatic hydrocarbon solvent, an aromatic hydrocarbon solvent, a ketone solvent, an ester solvent, an ether solvent, a cyclic ether solvent, an alcohol solvent, a halogen solvent, and the like can be used. Mentioned as the aliphatic hydrocarbon solvent are, for example, pentane, hexane, heptane, decane, and cyclohexane. Mentioned as the aromatic hydrocarbon solvent are, for example, benzene, toluene, and xylene. Mentioned as the ketone solvent are, for example, acetone, methyl ethyl ketone, methyl isobutyl ketone, and cyclohexanone. Mentioned as the ester solvent are, for example, methyl acetate, ethyl acetate, propyl acetate, and butyl acetate. Mentioned as the ether solvent are, for example, diethylether and dimethoxyethane. Mentioned as the cyclic ether solvent are, for example, tetrahydrofuran and dioxane. Mentioned as the alcohol solvent are methanol, ethanol, propanol, isopropanol, butanol, cyclohexanol, and the like. Mentioned as the halogen solvent are, for example, chloroform, 1,2-dichloroethane, methylene chloride, carbon tetrachloride, trichloroethylene, tetrachloroethylene, chlorobenzene, tetrachloro ethane, and bromobenzene. Two or more kinds of the organic solvents can be mixed.

Optical Element

Figure 3A:
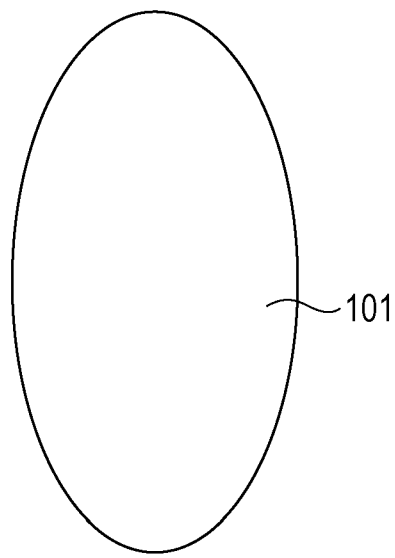
FIGS. 3A and 3B are views for explaining an optical element according to an embodiment of the invention.
Figure 3B:
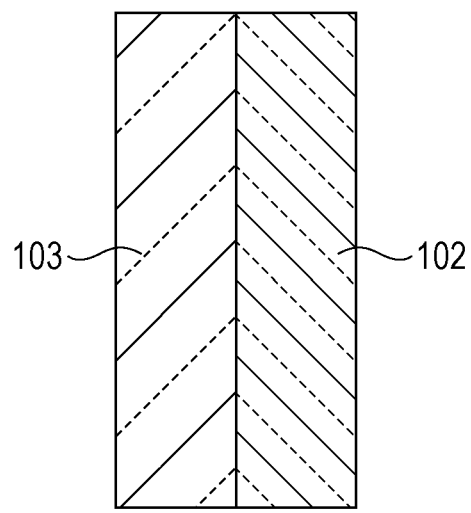

A second embodiment of the invention describes an optical element with reference to FIG. 3. FIG. 3A illustrates an optical element, such as a convex lens, containing an organic transparent member 101 produced from the composition according to the invention. FIG. 3B illustrates an optical element in which an organic transparent member 102 produced from the composition according to the invention is formed on a base material 103 containing an inorganic material, such as glass. To the organic transparent members 101 and 102, an antioxidant and a light resistant stabilizer may be added in accordance with the composition described above.

The antioxidant is not particularly limited insofar as it is a material which suppresses degradation due to oxidization of the composition. For example, a phenolic antioxidant, a phosphorous antioxidant, a sulfur antioxidant, and the like are mentioned. Among the above, the phenolic antioxidant, particularly an alkyl-substituted phenolic antioxidant is suitable. By compounding these antioxidants, coloring or strength reduction due to oxidization degradation or the like during molding can be prevented without reducing transparency, heat resistance, and the like.

The light resistant stabilizer is not particularly limited insofar as it is a material which suppresses degradation due to the irradiation of the composition with light. For example, a benzophenone light resistant stabilizer, a benzotriazole light resistant stabilizer, a hindered amine light resistant stabilizer, and the like are mentioned. In this embodiment, it is suitable to use the hindered amine light resistant stabilizer from the viewpoint of transparency, coloring resistance, and the like. Mentioned as an example of the optical element according to this embodiment are optical lenses and optical prisms including an image pick lens of a camera; a lens of a microscope, an endoscope, and a telescope; an all-optical transmitting lens such as eyeglass lens; a pickup lens for an optical disk, such as CD, CD-ROM, WORM (recordable optical disk), MO (rewritable optical disk; magnetooptical disk), MD (minidisk), or DVD (digital video disk); and a lens in a laser scanning system, such as an fθ lens for a laser beam printer or a lens for a sensor; and a prism lens in a finder system of a camera, and the like. Mentioned as other optical examples are a light guide plate of a liquid crystal display or the like; an optical film, such as a polarizer film, a retardation film, or an optical diffusion film; an optical diffusion plate; an optical card; a liquid crystal display element substrate; and the like. In particular, when the coefficient of linear expansion of generally used engineering plastics for optical use is 70 ppm/K or more, the use of the same as the optical element is considerably limited. However, when the coefficient of linear expansion is lower than 70 ppm/K, the application range is extended in an imaging optical lens of a compact digital still camera, an fθ lens of a laser beam printer, and the like among the optical elements mentioned above. Therefore, such a coefficient of linear expansion is suitable. Furthermore, when the coefficient of linear expansion is 65 ppm or lower, an effect of extending the use thereof particularly in an imaging optical system is obtained. Therefore, such a coefficient of linear expansion is more suitable.

The optical element according to this embodiment is suitably a lens among the examples mentioned above. The lens may be provided with an antireflection film on the surface and may be provided with an intermediate layer between the antireflection film and the optical element. The antireflection film is not particularly limited and is suitably one having a refractive index close to the refractive index of the lens. The intermediate layer is not particularly limited and suitably contains a material having a refractive index value between the refractive index value of the lens and the refractive index value of the antireflection film. Moreover, in the lens, a substantially opaque film in the used wavelength band may be formed at a portion where light cannot pass, generally a lens side end portion (Common name: edge portion) or the like in order to reduce internal reflection.

Method for Manufacturing Optical Element

An example of a method for manufacturing the optical element molded using the composition according to this embodiment is described. The optical element is produced by first preparing the above-described composition, and then undergoing a process for molding the obtained composition. The molding method is not particularly limited and it is suitable to use a molding method suitable for the shape of the target optical element. For example, mentioned are an injection molding process, a transfer molding method, a blow molding method, a rotational molding method, a vacuum molding method, an extrusion molding method, a calendar molding method, a solution casting method, a heat press molding method, an inflation method, and a solvent cast method.

The optical element can be used in various forms, such as a globular shape, a rod shape, a plate shape, a cylindrical shape, a pipe shape, a tubular shape, a fiber shape, or a film or sheet shape.

Hereinafter, a method for manufacturing an optical lens is described as an example of the optical element.

The optical lens is obtained by molding the above-described composition into a desired lens shape. The molding method is not particularly limited and a melt molding method is suitable in order to obtain a molded material excellent in the characteristics, such as low birefringent properties, mechanical strength, and dimension accuracy. Mentioned as the melt molding method are, for example, commercially available press molding, commercially available extrusion molding, commercially available injection molding, and the like, and the injection molding is suitable because the formability is good and the productivity is high.

The molding conditions are selected as appropriate depending on the intended use or the molding method. For example, the temperature of the composition when performing injection molding is suitably in the range of 100° C. to 400° C. Furthermore, it is more suitable that molding processing is performed under an inactive gas or a vacuum. After pouring the composition into a molding die, the temperature is increased to reach a temperature equal to or higher than the temperature at which the retro-Diels-Alder reaction occurs. This is because when the temperature is in the above-mentioned range, the composition has moderate fluidity during molding, sink or distortion is hard to occur in a molded article, silver streak due to thermal decomposition of the composition is hard to occur, and further yellowing of a molded material is hard to occur. Moreover, this is because, in the case where the process is performed under an inactive gas or a vacuum, yellowing of a molded material is notably suppressed.

EXAMPLES

Hereinafter, examples are described in order to describe the invention in detail but the invention is not limited to these examples. The measuring methods used in examples and comparative examples are the methods described below.

Number Average Molecular Weight and Weight Average Molecular Weight

The number average molecular weight (Mn) and the weight average molecular weight (Mw) of cross-linkable polymers in the following examples was measured by an RI (Refractive Index, differential refractive index) detector with a Gel Permeation Chromatography (GPC) device (manufactured by WATERS), and the measurement was performed by disposing two Shodex LF-804 columns (manufactured by Showa Denko K.K.) in series, setting the temperature to 40° C., and using THF as a developing solvent. The obtained number average molecular weight (Mn) and the weight average molecular weight (Mw) are values in terms of standard polystyrene.

Coefficient of Linear Expansion

The coefficient of linear expansion measured in examples and comparative examples was measured according to a coefficient of linear expansion test method (JIS-K7197) by a thermomechanical analysis of plastic. Specifically, the obtained film was cut into a test piece of a strip shape with 1.5 cm in length, 5 mm in width, and 100 μm in thickness, the test piece was placed in a thermomechanical analysis device (Manufactured by Rigaku Corporation, Thermo Plus EVO TMA8310), the temperature was raised or lowered twice in the range of −40° C. to 80° C. under a nitrogen flow (100 mL/min per minute) under the condition of a temperature elevation rate of 5° C./minute, and then the average coefficient of linear expansion in a temperature range of 0 to 40° C. at the second temperature rise was determined.

Analysis of Transparency

The transparency was analyzed by visually observing the obtained composition (film) as follows in examples and in comparative examples: the case where no foams were left and the composition was not cloudy was evaluated as ○ in which the composition was transparent and the case where foams were left and the composition was cloudy was evaluated as x in which the composition was not transparent.

NMR Measurement

For specifying the structure of the cycloolefin polymer, a hydrogen nuclear magnetic resonance device ($^1$H NMR) and a carbon nuclear magnetic resonance device ($^{13}$C NMR) (manufactured by Bruker BioSpin K.K., Avance 600 MHz) were used. It was dissolved in a heavy chloroform solvent and tetramethylsilane was used as the standard of chemical shift. The $^{13}$C-NMR spectrum was measured by a reverse gated decoupling mode.

Example 1

Preparation of Cross-Linkable Polymer

To 15 g (125.0 mmol) of 2,3-dimethylenebicyclo[2,2,1]heptane, 750 mg (4.6 mmol) of 2,2'-azobis(isobutyronitril) (hereinafter referred to as AIBN) was added as a polymerization initiator, a flask was tightly sealed with a glass stopper, the flask was immersed in an 80° C. oil bath, and then a polymerization reaction was performed for 24 hours while stirring. The flask was cooled, and then the polymerization was stopped by bringing the polymerization solution in the flask into contact with the air, thereby obtaining a cross-linkable polymer. The obtained cross-linkable polymer was diluted in 500 ml of THF, and then the diluted solution was added dropwise into methanol, thereby precipitating and recovering a 2,3-dimethylenebicyclo[2,2,1]heptane polymer which is a cross-linkable polymer. 7.32 g (Yield of 48.8%) of the 2,3-dimethylenebicyclo[2,2,1]heptane polymer was obtained. As the molecular weight of the obtained 2,3-dimethylenebicyclo[2,2,1]heptane polymer, Mn=62.3×10$^3$ and Mw=11.4×10$^4$ were obtained.

Preparation of Cycloolefin Polymer

In this example, TOPAS5013S-04 (trade name, manufactured by Polyplastics Co., Ltd.) was used as a cycloolefin polymer. TOPAS is an ethylene/cycloolefin random copolymer obtained by addition copolymerization of ethylene and 2-norbornene using a metallocene catalyst. When the used TOPAS5013S-04 was measured using $^1$H NMR and $^{13}$C NMR to thereby identify the structure to determine the composition, Ethylene component/Norbornene component=53/47 (molar ratio) was found. The structure of the used TOPAS5013S-04 is represented by the following formula (22).

Formula (22)

(In Formula (22), n=47 and m=53.)

Production of Composition of Cross-Linkable Polymer and Cycloolefin Polymer

The cycloolefin polymer (8 g) and the 2,3-dimethylenebicyclo[2,2,1]heptane polymer (1 g) which is the cross-linkable polymer each were dissolved in toluene and then mixed, the mixture was diluted to a suitable concentration, and the diluted mixture was added dropwise into 500 ml of methanol, and then precipitating and recovering a composition of the cross-linkable polymer and the cycloolefin polymer.

Production of Composition of Cross-Linked Structure and Cycloolefin Polymer

The composition (0.1 g) of the cross-linkable polymer and the cycloolefin polymer obtained above was put in a circular metal die having a height of 100 μm and a diameter of 3 cm, and then heat pressed by a vacuum hot press machine (manufactured by Imoto Machinery Co., Ltd., Vacuum hot press 11FA) for 10 minutes at 200° C. and at a pressure of 1 MPa under a vacuum and further heat pressed for 1 hour at a pressure of 40 MPa after increasing the temperature to 280° C., thereby producing a 100 μm thick film. From the charge amounts mentioned above, it is considered that the obtained film is a composition in which the cross-linked structure is contained in a proportion of 13 parts by weight based on 100 parts by weight of the cycloolefin polymer. The obtained film was transparent and the coefficient of linear expansion was 69 ppm/K.

Example 2

The same operation as in Example 1 was performed except producing a composition of a cross-linked structure and a cycloolefin polymer using the cross-linkable polymer polymerized according to the polymerization method described in Example 1, a 2,3-dimethylenebicyclo[2,2,1]heptane polymer (1 g), and the cycloolefin polymer (6 g) described in Example 1. From the charge amounts mentioned above, it is considered that the obtained film is a composition in which the cross-linked structure is contained in a proportion of 17 parts by weight based on 100 parts by weight of the cycloolefin polymer. The obtained film was transparent and the coefficient of linear expansion was 66 ppm/K.

Example 3

The same operation as in Example 1 was performed except producing a composition of a cross-linked structure and a cycloolefin polymer using the cross-linkable polymer polymerized according to the polymerization method described in Example 1, a 2,3-dimethylenebicyclo[2,2,1]heptane polymer (1 g), and the cycloolefin polymer (4 g) described in Example 1. From the charge amounts mentioned above, it is considered that the obtained film is a composition in which the cross-linked structure is contained in a proportion of 25 parts by weight based on 100 parts by weight of the cycloolefin polymer. The obtained film was transparent and the coefficient of linear expansion was 64 ppm/K.

Comparative Example 1

The cycloolefin polymer (0.1 g) described in Example 1 was put in a circular metal die having a height of 100 μm and a diameter of 3 cm, and then heat pressed by a vacuum hot press machine for 20 minutes at 200° C. and at a pressure of 40 MPa under a vacuum, thereby producing a 100 μm thick film. In this comparative example, since only the cycloolefin polymer was used, the cross-linked structure is 0 part by weight based on 100 parts by weight of the cycloolefin polymer. The obtained film was transparent but the coefficient of linear expansion was 78 ppm/K.

Comparative Example 2

A cross-linked structure was produced using the thermally cross-linkable polymer polymerized according to the polymerization method described in Example 1 and a 2,3-dimethylenebicyclo[2,2,1]heptane polymer (0.1 g). Specifically, the polymers were put in a circular metal die having a height of 100 μm and a diameter of 3 cm, and then heat pressed by a vacuum hot press machine (manufactured by Imoto Machinery Co., Ltd., vacuum hot press 11FA) for 10 minutes at 200° C. and at a pressure of 1 MPa under a vacuum and further heat pressed for 1 hour at a pressure of 40 MPa after increasing the temperature to 280° C. As a result, foams were formed, and a film-shaped substance was not obtained. Foams were confirmed in the obtained substance, and the substance was not transparent. Since a film-shaped substance was not obtained, the coefficient of linear expansion was not able to be measured. Since only the cross-linked structure was used in this comparative example, a cycloolefin polymer is 0 part by weight based on 100 parts by weight of the cross-linked structure.

The above results are shown in Table 1.

TABLE 1

| | Amount (parts by weight) of cycloolefin polymer in composition | Amount (parts by weight) of cross-linked structure in composition | Cycloolefin polymer | Coefficient of linear expansion (ppm/K) | Transparency |
|---|---|---|---|---|---|
| Ex. 1 | 100 | 13 | TOPAS5013S-04 | 69 | ○ |
| Ex. 2 | 100 | 17 | TOPAS5013S-04 | 66 | ○ |
| Ex. 3 | 100 | 25 | TOPAS5013S-04 | 64 | ○ |
| Comp. Ex. 1 | 100 | — | TOPAS5013S-04 | 78 | ○ |
| Comp. Ex. 2 | — | 100 | — | — (Unmeasurable) | x |

Example 4

The same operation as in Example 1 was performed except producing a composition of a cross-linked structure and a cycloolefin polymer using the thermally cross-linkable polymer polymerized according to the polymerization method described in Example 1, 2,3-dimethylenebicyclo[2,2,1]heptane polymer (1 g), and a cycloolefin polymer obtained by addition copolymerization of an α-olefin (ethylene) and tetracyclo dodecene [manufactured by Mitsui Chemicals, Inc, Trade name: APEL 6011T, Tetracyclo dodecene:Ethylene=25:75 (which was calculated after identifying the structure from $^1$H-NMR and $^{13}$C-NMR structure)] (4 g). The structure of the ethylene/tetracyclo dodecene random copolymer is shown by the following Formula (23).

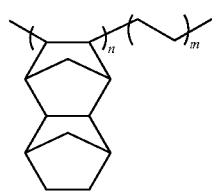

Formula (23)

(In Formula (23), n=25 and m=75)

From the charge amounts mentioned above, it is considered that the obtained film is a composition in which the cross-linked structure is contained in a proportion of 10 parts by weight based on 100 parts by weight of the cycloolefin polymer. The obtained film was transparent and the coefficient of linear expansion was 69 ppm/K.

Example 5

The same operation as in Example 1 was performed except producing a composition of a cross-linked structure and a cycloolefin polymer using the cross-linkable polymer polymerized according to the polymerization method described in Example 1, a 2,3-dimethylenebicyclo[2,2,1]heptane polymer (0.5 g), and the cycloolefin polymer (4.5 g) described in Example 4. From the charge amounts mentioned above, it is considered that the obtained film is a composition in which the cross-linked structure is contained in a proportion of 30 parts by weight based on 100 parts by weight of the cycloolefin polymer. The obtained film was transparent and the coefficient of linear expansion was 68 ppm/K.

Comparative Example 3

The cycloolefin polymer (0.1 g) described in Example 6 which is the above-described ring opened polymer was put in a circular metal die having a height of 100 μm and a diameter of 3 cm, and then heat pressed by a vacuum hot press machine for 20 minutes at 200° C. and at a pressure of 40 MPa under a vacuum, thereby producing a 100 μm thick film. In this comparative example, since only the cycloolefin polymer was used, the cross-linked structure is 0 part by weight based on 100 parts by weight of the cycloolefin polymer. The obtained film was transparent but the coefficient of linear expansion was 75 ppm/K.

Example 6

The same operation as in Example 1 was performed except producing a composition of a cross-linked structure and a cycloolefin polymer using the cross-linkable polymer polymerized according to the polymerization method described in Example 1, a 2,3-dimethylenebicyclo[2,2,1]heptane polymer (1 g), and a cycloolefin polymer [manufactured by Nippon Zeon Co., Ltd., trade name ZeonexE48R] (4 g) which is a ring opened polymer of cycloolefin monomers. From the charge amounts mentioned above, it is considered that the obtained film is a composition in which the cross-linked structure is contained in a proportion of 10 parts by weight based on 100 parts by weight of the cycloolefin polymer. The obtained film was transparent and the coefficient of linear expansion was 68 ppm/K.

Example 7

The same operation as in Example 1 was performed except producing a composition of a cross-linked structure and a cycloolefin polymer using the cross-linkable polymer polymerized according to the polymerization method described in Example 1, a 2,3-dimethylenebicyclo[2,2,1]heptane polymer (0.5 g), and the cycloolefin polymer (4.5 g) described in Example 6. From the charge amounts mentioned above, it is considered that the obtained film is a composition in which the cross-linked structure is contained in a proportion of 30 parts by weight based on 100 parts by weight of the cycloolefin polymer. The obtained film was transparent and the coefficient of linear expansion was 66 ppm/K.

Comparative Example 4

The cycloolefin polymer (0.1 g) described in Example 6 which is the above-described ring opened polymer was put in a circular metal die having a height of 100 μm and a diameter of 3 cm, and then heat pressed by a vacuum hot press machine for 20 minutes at 200° C. and at a pressure of 40 MPa under a vacuum, thereby producing a 100 μm thick film. In this comparative example, since only the cycloolefin polymer was used, the cross-linked structure is 0 part by weight based on 100 parts by weight of the cycloolefin polymer. The obtained film was transparent but the coefficient of linear expansion was 72 ppm/K.

Comparative Example 5

As a cross-linkable polymer, a mixture of 0.11 g of a bisphenol A type epoxy resin [trade name jER828, manufactured by Mitsubishi Chemical, Inc.] and 0.09 g of acid anhydride [trade name: RIKACID MH-700, manufactured by New Japan Chemical Co., Ltd.] was produced, the cross-linkable polymer mixture and the cycloolefin polymer described in Example 1 (1.8 g) which is the above-described ring opened polymer each were dissolved in toluene and then mixed, and thereafter only the solvent was evaporated, thereby producing a composition of the cross-linkable polymer and the cycloolefin polymer. The composition was put in a circular metal die having a height of 100 μm and a diameter of 3 cm, and then heat pressed by a vacuum hot press machine for 1 hour at 200° C. and at a pressure of 40 MPa under a vacuum, thereby producing a 100 μm thick film. The film obtained in this comparative example was cloudy, and a good molded material was not able to be obtained and the coefficient of linear expansion was not able to be measured.

The above results are shown in Table 2.

TABLE 2

|  | Amount (parts by weight) of cycloolefin polymer in composition | Amount (parts by weight) of cross-linked structure in composition | Cycloolefin polymer | Coefficient of linear expansion (ppm/K) | Transparency |
|---|---|---|---|---|---|
| Ex. 4 | 100 | 10 | APEL6013 | 69 | ○ |
| Ex. 5 | 100 | 30 | APEL6013 | 68 | ○ |
| Comp. Ex. 3 | 100 | — | APEL6013 | 75 | ○ |
| Ex. 6 | 100 | 10 | Zeonex E48R | 68 | ○ |
| Ex. 7 | 100 | 30 | Zeonex E48R | 66 | ○ |
| Comp. Ex. 4 | 100 | — | Zeonex E48R | 72 | ○ |
| Comp. Ex. 5 | 100 | 10 (Epoxy compound) | TOPAS5013S-04 | — (Unmeasurable) | x |

The results of the examples and the comparative examples above shows that the composition of the cycloolefin polymer and the cross-linked structure in the examples were transparent and had a low coefficient of linear expansion.

The coefficient of linear expansion of the compositions of the cycloolefin polymer and the cross-linked structure in the examples was lower than that of an uncrosslinked cycloolefin polymer and was lower than 70 ppm/K, so that the effect of extending the application range of the cycloolefin polymer in an imaging lens or an electronic substrate was obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-122743, filed May 31, 2011, which is hereby incorporated by reference herein in its entirety.

What is claimed is:

1. A composition, comprising:
a polymer having a repeated structural unit represented by at least one of the following formula (1) and formula (2) and having a number average molecular weight of 10000 or more and 200000 or lower,
the composition further having a cross-linked structure having a repeated structural unit represented by Formula (3), and
the cross-linked structure being contained in a proportion of 10 parts by weight or more and 1000 parts by weight or lower based on 100 parts by weight of the polymer,

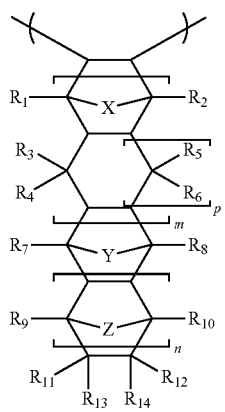

Formula (1)

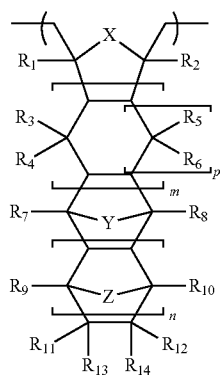

Formula (2)

wherein, in Formulae (1) and (2), m is 0 or 1, n is an integer of 0 to 3, and p is 0 or 1,
$R_1$ to $R_{14}$ each independently represent a hydrogen atom, a halogen atom, or a hydrocarbon group having 1 to 20 carbon atoms,
$R_{11}$ to $R_{14}$ may be combined with each other to form a monocyclic ring or a polycyclic ring and the monocyclic ring or the polycyclic may have a double bond,
$R_{11}$ and $R_{13}$ or $R_{12}$ and $R_{14}$ may form an alkylidene group, and
X, Y, and Z each are independently selected from —O—, —NH—, —S—, —CH$_2$—, —CH$_2$—CH$_2$—, and —CH(CH$_3$)—,

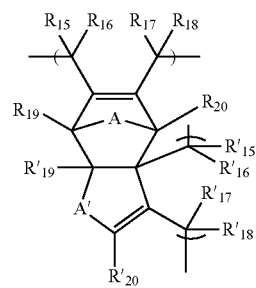

Formula (3)

wherein, in Formula (3), $R_{15}$ to $R_{20}$ and $R'_{15}$ to $R'_{20}$ each are independently selected from a hydrogen atom, a halogen atom, or a hydrocarbon group having 1 to 20 carbon atoms and A and A' each are independently selected from —O—, —NH—, —S—, —CH$_2$—, —CH$_2$—CH$_2$—, or —CH(CH$_3$)—.

2. The composition according to claim 1, wherein, in Formula (3), $R_{15}$ to $R_{20}$ and $R'_{15}$ to $R'_{20}$ are hydrogen atoms and A and A' each are independently selected from —CH$_2$—, —CH$_2$—CH$_2$—, or —CH(CH$_3$)—.

3. The composition according to claim 1, wherein, in Formulae (1) and (2), m+n is an integer of 0 to 2 and X, Y, and Z each are independently selected from —CH$_2$—, —CH$_2$—CH$_2$—, and —CH(CH$_3$)—.

4. The composition according to claim 1, wherein the composition is a copolymer having a repeated structural unit represented by Formula (1) and a repeated structural unit represented by the following formula (19) and the molar ratio of the repeated structural unit represented by Formula (19) and the repeated structural unit represented by Formula (1) is in the range of 5:95 to 95:5

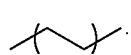

Formula (19)

5. The composition according to claim 1, wherein, in Formula (1), m=0 and n=0, X, Y, and Z are all —CH$_2$—, and $R_1$ to $R_{10}$ are all hydrogen atoms.

6. The composition according to claim 1, wherein, in Formula (1), m=0 and n=1, X, Y, and Z are all —CH$_2$—, and $R_1$ to $R_{10}$ are all hydrogen atoms.

7. The composition according to claim 1, wherein, in Formula (2), m=0 and n=0, X, Y, and Z are all —CH$_2$—, and $R_1$ to $R_{10}$ are all hydrogen atoms.

8. The composition according to claim 1, wherein the polymer having the repeated structural unit represented by Formula (1) above is a copolymer having repeated structural units represented by the following formulae (19) and (20) and the molar ratio of the repeated structural unit represented by Formula (19) and the repeated structural unit represented by Formula (20) is in the range of 5:95 to 95:5

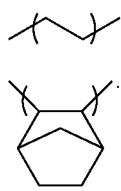

Formula (19)

Formula (20)

9. The composition according to claim 1, wherein the polymer having the repeated structural unit represented by Formula (1) above is a copolymer having repeated structural units represented by the following formulae (19) and (21) and the molar ratio of the repeated structural unit represented by Formula (19) and the repeated structural unit represented by Formula (21) is in the range of 5:95 to 95:5

Formula (19)

Formula (21)

10. The composition according to claim 1, wherein, in Formula (3), $R_{15}$ to $R_{20}$ and $R'_{15}$ to $R'_{20}$ are hydrogen atoms and A and A' each are independently selected from —$CH_2$—, —$CH_2$—$CH_2$—, or —$CH(CH_3)$—.

11. A composition, comprising:
a polymer having a repeated structural unit represented by at least one of the following formula (1) and formula (2) and having a number average molecular weight of 10000 or more and 200000 or lower,
the composition further having a cross-linked structure having a cross-linking point which is generated by a retro-Diels-Alder-reaction and a Diels-Alder reaction of a polymer having a repeated structural unit represented by the following formula (4) and the cross-linked structure being contained in a proportion of 10 parts by weight or more and 1000 parts by weight or lower based on 100 parts by weight of the polymer having the repeated structural unit represented by Formula (1) or Formula (2),

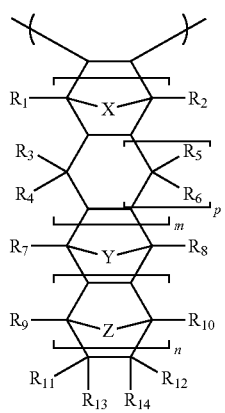

Formula (1)

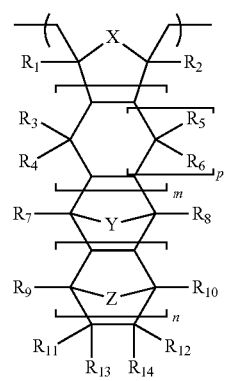

Formula (2)

wherein, in Formulae (1) and (2), m is 0 or 1, n is an integer of 0 to 3, and p is 0 or 1,
$R_1$ to $R_{14}$ each independently represent a hydrogen atom, a halogen atom, or a hydrocarbon group having 1 to 20 carbon atoms,
$R_{11}$ to $R_{14}$ may be combined with each other to form a monocyclic ring or a polycyclic ring and the monocyclic ring or the polycyclic may have a double bond,
$R_{11}$ and $R_{13}$ or $R_{12}$ and $R_{14}$ may form an alkylidene group, and
X, Y, and Z each are independently selected from —O—, —NH—, —S—, —$CH_2$—, —$CH_2$—$CH_2$—, and —$CH(CH_3)$—,

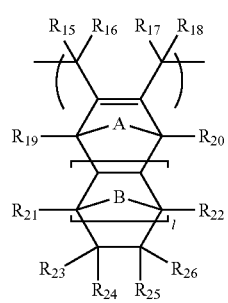

Formula (4)

wherein, in Formula (4), l is an integer of 0 to 2,
$R_{15}$ to $R_{26}$ each are independently selected from a hydrogen atom, a halogen atom, or a hydrocarbon group having 1 to 20 carbon atoms,
$R_{23}$ and $R_{26}$ may be combined to form a ring, and
A and B each are independently selected from —O—, —NH—, —S—, —$CH_2$—, —$CH_2$—$CH_2$—, or —$CH(CH_3)$—.

12. An optical element, comprising an organic transparent member, the organic transparent member containing the composition according to claim 1.

13. The optical element according to claim 12, wherein the organic transparent member further has an antioxidant and a light resistant stabilizer.

14. A method for manufacturing a composition, comprising:
mixing a polymer having a repeated structural unit represented by at least one of the following formula (1) and formula (2) and having a number average molecular weight of 10000 or more and 200000 or lower and a polymer having a repeated structural unit represented by the following formula (4) and having a number average molecular weight of 1000 or more and 200000 or lower; and
cross-linking the polymer having the repeated structural unit represented by Formula (4), Formula (1)

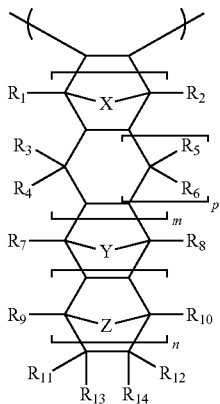

Formula (2)

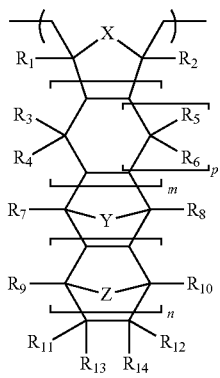

wherein, in Formulae (1) and (2), m is 0 or 1, n is an integer of 0 to 3, and p is 0 or 1, $R_1$ to $R_{14}$ each independently represent a hydrogen atom, a halogen atom, or a hydrocarbon group having 1 to 20 carbon atoms, and $R_{11}$ to $R_{14}$ may be combined with each other to form a monocyclic ring or a polycyclic ring and the monocyclic ring or the polycyclic may have a double bond, Formula (4)

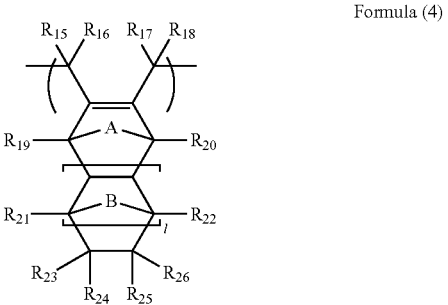

wherein, in Formula (4), l is an integer of 0 to 2, $R_{15}$ to $R_{26}$ each are selected from a hydrogen atom, a halogen atom, or a hydrocarbon group having 1 to 20 carbon atoms, $R_{23}$ and $R_{26}$ may be combined to form a ring, and A and B each are independently selected from —O—, —NH—, —S—, —CH$_2$—, —CH$_2$—CH$_2$—, or —CH(CH$_3$)—.

* * * * *